(12) United States Patent
Wang et al.

(10) Patent No.: US 11,095,112 B2
(45) Date of Patent: Aug. 17, 2021

(54) DRIVING PROTECTION CIRCUIT, OPERATING CIRCUIT AND CONTROL METHOD

(71) Applicant: Nuvoton Technology Corporation, Hsinchu Science Park (TW)

(72) Inventors: Cheng-Chih Wang, Jhubei (TW); Chih-Ping Lu, Hsinchu (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 16/701,839

(22) Filed: Dec. 3, 2019

(65) Prior Publication Data
US 2020/0176970 A1 Jun. 4, 2020

(30) Foreign Application Priority Data
Dec. 3, 2018 (TW) .................. 107143194

(51) Int. Cl.
*H02H 3/20* (2006.01)
*H02H 1/00* (2006.01)

(52) U.S. Cl.
CPC ............ *H02H 3/20* (2013.01); *H02H 1/0007* (2013.01)

(58) Field of Classification Search
CPC ........ H02H 3/20; H02H 1/0007; H02H 3/202; H02H 3/205; H02H 3/207
See application file for complete search history.

(56) References Cited

U.S. PATENT DOCUMENTS

| | | | |
|---|---|---|---|
| 6,259,588 B1 | 7/2001 | Sample et al. | |
| 8,970,134 B2 | 3/2015 | Breuer et al. | |
| 9,455,566 B2 | 9/2016 | Hiyama | |
| 2011/0181114 A1* | 7/2011 | Hodges | H02J 9/005 307/39 |
| 2012/0074782 A1* | 3/2012 | Hodges | H02J 9/005 307/39 |
| 2012/0074792 A1* | 3/2012 | Hodges | H02J 9/005 307/126 |
| 2014/0252954 A1* | 9/2014 | Breuer | H05B 45/58 315/119 |

FOREIGN PATENT DOCUMENTS

| | | |
|---|---|---|
| CN | 105934040 B | 12/2010 |
| CN | 104808536 A | 7/2015 |
| WO | WO 2010/143338 A | 12/2010 |

\* cited by examiner

*Primary Examiner* — Rafael O De Leon Domenech
(74) *Attorney, Agent, or Firm* — Muncy, Geissler, Olds & Lowe, P.C.

(57) ABSTRACT

A driving protection circuit is coupled to a load via an input/output pin. A signal generator circuit is configured to generate a driving signal. An input/output circuit transmits the driving signal to the input/output pin according to an enable signal. A counter circuit adjusts the count value when the enable signal is at a predetermined level. A detection circuit detects the voltage level of the input/output pin to generate a detection signal. When the count value is equal to a predetermined value, a control circuit determines whether the level of the detection signal is the same as the level of the driving signal. When the level of the detection signal is not the same as the level of the driving signal, the control circuit sends an error signal to turn off power to the load.

20 Claims, 7 Drawing Sheets

DRIVING PROTECTION CIRCUIT, OPERATING CIRCUIT AND CONTROL METHOD

CROSS REFERENCE TO RELATED APPLICATIONS

This Application claims priority of Taiwan Patent Application No. 107143194, filed on Dec. 3, 2018, the entirety of which is incorporated by reference herein.

BACKGROUND OF THE INVENTION

Field of the Invention

The invention relates to a driving protection circuit, and more particularly to a driving protection circuit that provides an error signal to an external load.

Description of the Related Art

Electronic devices generally comprise driving circuits that provide driving signals to loads. The loads operate according to these driving signals. However, when noise interferes with a driving signal, the driving signal may be at an abnormal level. Therefore, the load may malfunction or be damaged due to the abnormal driving signal.

BRIEF SUMMARY OF THE INVENTION

In accordance with an embodiment, a driving protection circuit is coupled to a load via an input/output pin and comprises a signal generator circuit, an input/output circuit, a counter circuit, a detection circuit, and a control circuit. The signal generator circuit is configured to generate a driving signal. The input/output circuit transmits the driving signal to the input/output pin according to an enable signal. The counter circuit adjusts a count value in response to the enable signal being at a predetermined level. The detection circuit is coupled to the input/output pin and detects the voltage level of the input/output pin to generate a detection signal. The control circuit is coupled to the counter circuit and the detection circuit. In response to the count value being equal to a predetermined value, the control circuit determines whether the level of the detection signal is the same as the level of the driving signal. In response to the level of the detection signal not being the same as the level of the driving signal, the control circuit sends an error signal to turn off power to the load.

In accordance with another embodiment, an operating circuit comprises a power supply circuit, a transistor, a first input/output pin, and a driving protection circuit. The power supply circuit is configured to provide an operating voltage. The transistor is configured to receive the operating voltage. The first input/output pin is coupled to a gate of the transistor. The driving protection circuit is coupled to the first input/output pin and comprises a signal generator circuit, an input/output circuit, a counter circuit, a detection circuit and a control circuit. The signal generator circuit is configured to generate a driving signal. The input/output circuit transmits the driving signal to the first input/output pin according to an enable signal. The counter circuit adjusts a count value in response to the enable signal being at a predetermined level. The detection circuit is coupled to the first input/output pin and detects a voltage level of the first input/output pin to generate a detection signal. The control circuit is coupled to the counter circuit and the detection circuit. When the count value is equal to a predetermined value, the control circuit determines whether the level of the detection signal is the same as the level of the driving signal. When the level of the detection signal is not the same as the level of the driving signal, the control circuit sends an error signal to turn off power to the load.

In accordance with a further embodiment, a control method comprises generating a driving signal; providing the driving signal to an input/output pin and enabling a counter circuit, wherein the input/output pin is coupled to a load; detecting the voltage level of the input/output pin to generate a detection signal; determining whether a count value of the counter circuit is equal to a predetermined value; in response to determining that the count value of the counter circuit being equal to the predetermined value, determining whether the level of the detection signal is the same as the level of the driving signal; in response to determining that the level of the detection signal is not the same as the level of the driving signal, turning off power to the load.

The control method may be practiced by the systems which have hardware or firmware capable of performing particular functions and may take the form of program code embodied in a tangible media. When the program code is loaded into and executed by an electronic device, a processor, a computer or a machine, the electronic device, the processor, the computer or the machine becomes an apparatus for practicing the disclosed method.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale.

The dimensions and the relative dimensions do not correspond to actual dimensions in the practice of the invention.

Figure 1:
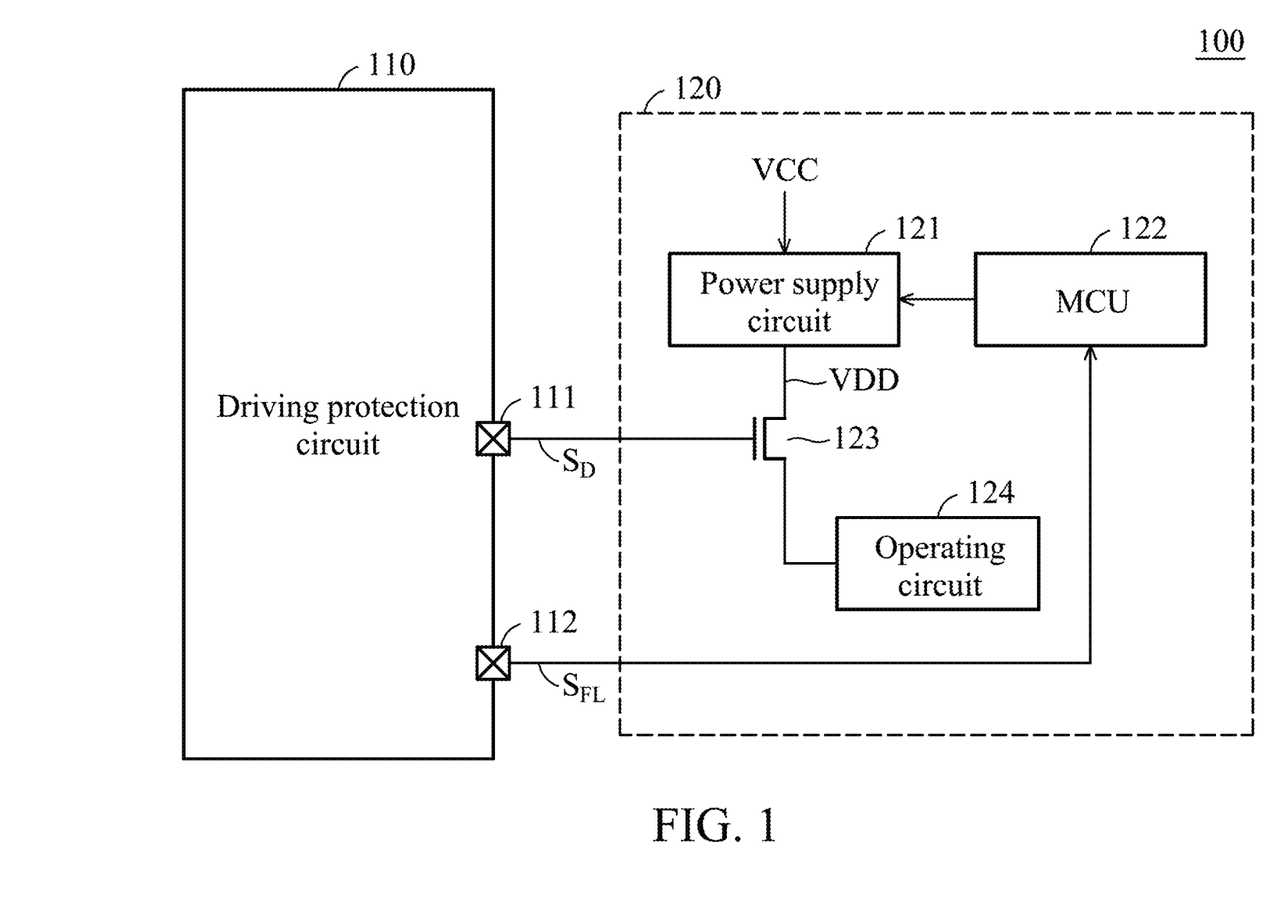
FIG. 1 is a schematic diagram of an exemplary embodiment of an operating circuit according to various aspects of the present disclosure.

FIG. 1 is a schematic diagram of an exemplary embodiment of an operating circuit according to various aspects of the present disclosure. The operating circuit 100 comprises a driving protection circuit 110 and a load 120. In one embodiment, the driving protection circuit 110 and the load 120 are disposed in the same printed circuit board (PCB). In another embodiment, the driving protection circuit 110 is a chipset and the load 120 is another independent chipset.

The driving protection circuit 110 provides a driving signal $S_D$ to the load 120 via an input/output pin 111. The load 120 operates according to the driving signal $S_D$. In this embodiment, the driving protection circuit 110 is configured to determine whether the voltage level of the input/output pin 111 is abnormal. When the voltage level of the input/output pin 111 is abnormal, the load 120 may be damaged by the abnormal voltage level of the input/output pin 111. Therefore, the driving protection circuit 110 outputs an error signal $S_{FL}$ via an input/output pin 112 to turn off the power to the load 120. In other embodiments, when the voltage level of the input/output pin 111 is abnormal, the driving protection circuit 110 stops providing the driving signal $S_D$ to the load 120. The operating principle of the driving protection circuit 110 is described in the following paragraphs.

The circuit structure of the load 120 is not limited in the present disclose. In one embodiment, the load 120 comprises a power supply circuit 121, a microcontroller unit (MCU) 122, a transistor 123 and an operating circuit 124. The power supply circuit 121 is configured to transform an input voltage VCC to an operating voltage VDD. The circuit structure of the power supply circuit 121 is not limited in the present disclose. In one embodiment, the power supply circuit 121 is a buck converter.

The transistor 123 transmits the operating voltage VDD to the operating circuit 124 according to the driving signal $S_D$. The kind of transistor 123 is not limited in the present disclosure. In one embodiment, the transistor 123 is a MOS transistor. In other embodiments, the transistor 123 is an N-type transistor. The N-type transistor comprises a gate receiving the driving signal $S_D$, a drain receiving the operating voltage VDD and a source coupled to the operating circuit 124. The operating circuit 124 operates according to the operating voltage VDD.

The MCU 122 is configured to control the power supply circuit 121. For example, when the driving protection circuit 110 does not output the error signal $S_{FL}$, the MCU 122 directs the power supply circuit 121 to transform the input voltage VCC to the operating voltage VDD and provide the operating voltage to the transistor 123. However, when the driving protection circuit 110 outputs the error signal $S_{FL}$, the MCU 122 directs the power supply circuit 121 to stop transforming the input voltage VCC. Therefore, the operating circuit 124 cannot receive the operating voltage VDD via the transistor 123. In other embodiments, the power supply circuit 121 directly receives the error signal $S_{FL}$. In such cases, when the driving protection circuit 110 outputs the error signal $S_{FL}$, the power supply circuit 121 stops operating. When the driving protection circuit 110 does not output the error signal $S_{FL}$, the power supply circuit 121 provides the operating voltage VDD to the transistor 123.

Figure 2A:
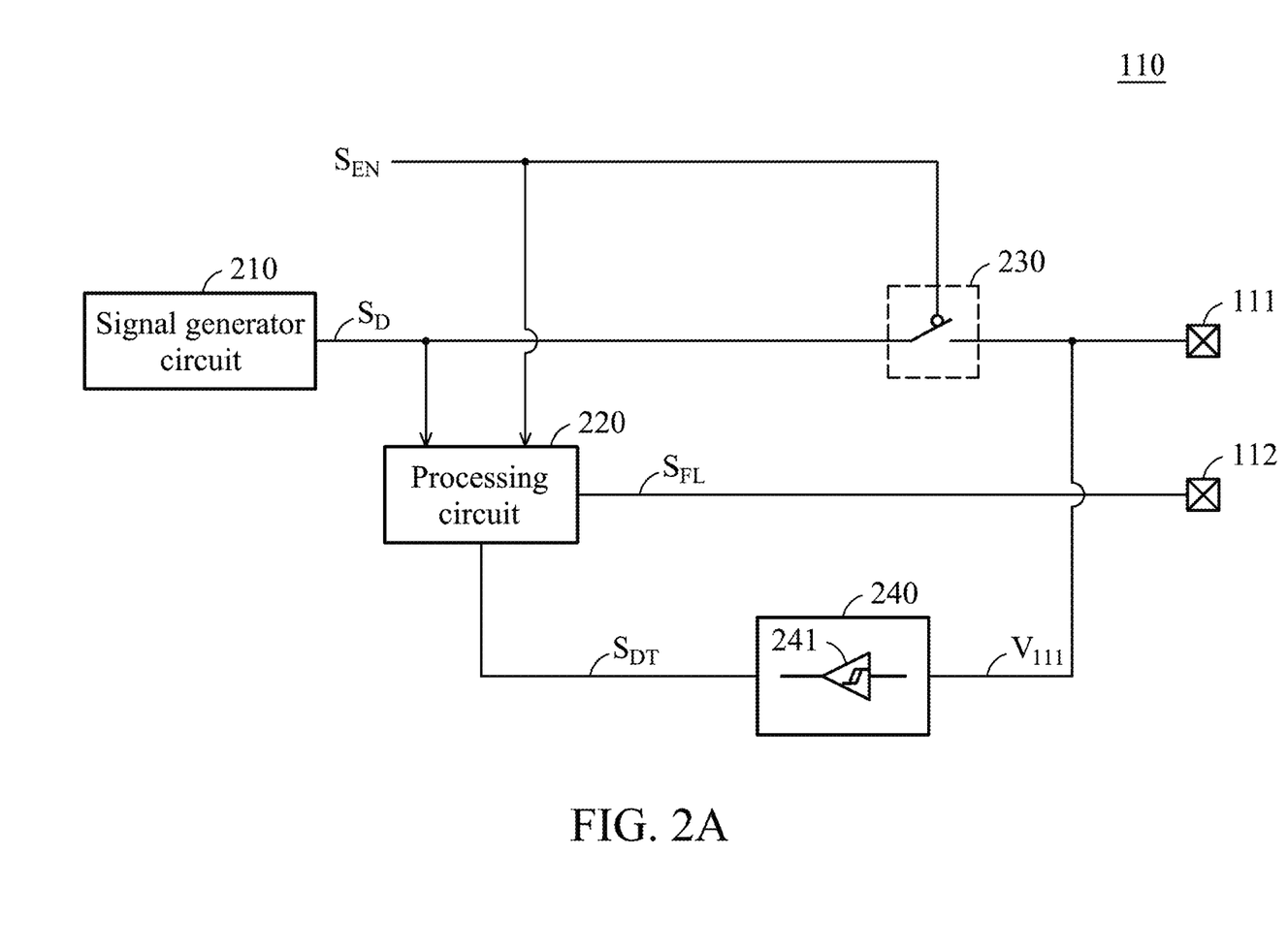
FIG. 2A is a schematic diagram of an exemplary embodiment of a driving protection circuit according to various aspects of the present disclosure.

FIG. 2A is a schematic diagram of an exemplary embodiment of the driving protection circuit 110 according to various aspects of the present disclosure. As shown in FIG. 2A, the driving protection circuit 110 comprises a signal generator circuit 210, a processing circuit 220, an input/output circuit 203 and a detection circuit 240. The signal generator circuit 210 is configured to generate the driving signal $S_D$. In one embodiment, the driving signal $S_D$ is a pulse width modulation (PWM) signal.

The input/output circuit 203 transmits the driving signal $S_D$ to the input/output pin 111 according to an enable signal $S_{EN}$. In this embodiment, when the enable signal $S_{EN}$ is at a predetermined level (e.g., a high level), the input/output circuit 230 transmits the driving signal $S_D$ to the input/output pin 111. When the enable signal $S_{EN}$ is not at the predetermined level, the input/output circuit 230 stop transmitting the driving signal $S_D$ to the input/output pin 111. In one embodiment, the input/output circuit 230 is an input/output (I/O) buffer.

The detection circuit 240 is coupled to the input/output pin 111 and detects the voltage level $V_{111}$ of the input/output pin 111 to generate a detection signal $S_{DT}$. The circuit structure of the detection circuit 240 is not limited in the present disclosure. Any circuit can serve as the detection circuit 240, as long as the circuit is capable of detecting the voltage level of the input/output pin 111.

In one embodiment, noise or the voltage of the other input/output pin, which is adjacent to the input/output pin 111 may interfere with the voltage level $V_{111}$ of the input/output pin 111, thereby changing the voltage level $V_{111}$ of the input/output pin 111. To eliminate transient noise interference in the input/output pin 111, the detection circuit 240 may comprise a surge reduction filter 241. When the voltage level $V_{111}$ of the input/output pin 111 is higher than a first threshold value, the surge reduction filter 241 sets the driving signal $S_D$ to a first level, i.e. the high level. When the voltage level $V_{111}$ of the input/output pin 111 is lower than a second threshold value, the surge reduction filter 241 sets the driving signal $S_D$ to a second level, i.e. the low level. The first threshold value may be high than the second threshold value. Therefore, when the voltage level $V_{111}$ of the input/output pin 111 changes slightly (for example, when the voltage level $V_{111}$ of the input/output pin 111 switches between the first and second threshold values), the surge reduction filter 241 does not change the level of the driving signal $S_D$. In one embodiment, the surge reduction filter 241 is a Schmitt trigger. When the speed of the surge reduction filter 241 is fast, the surge can be detected in time.

The processing circuit 220 determines whether to provide the error signal SF, according to the enable signal $S_{EN}$, the driving signal $S_D$ and the detection signal $S_{DT}$. In this embodiment, when the input/output circuit 230 is turned on by the enable signal $S_{EN}$, the voltage level $V_{111}$ of the input/output pin 111 should be equal to the driving signal $S_D$. However, the voltage level $V_{111}$ of the input/output pin 111 takes a long time to be equal to the driving signal $S_D$. In one embodiment, after the input/output circuit 230 is turned on, the processing circuit 220 determines whether the voltage level of the input/output pin 111 is abnormal at regular time intervals. Therefore, the processing circuit 220 does not misjudge the voltage level of the input/output pin 111, for example, the processing circuit 220 mistakenly judges that the detection signal $S_{DT}$ is different from the driving signal $S_D$. For example, when the enable signal $S_{EN}$ is at a predetermined level, the input/output circuit 230 is turned on. Therefore, the processing circuit 220 waits a first predetermined time and then compares the driving signal $S_D$ and the detection signal $S_{DT}$ to determine whether the voltage level $V_{111}$ of the input/output pin 111 is abnormal. When the level of the detection signal $S_{DT}$ is different from the level of the driving signal $S_D$, it means that the voltage level $V_{111}$ of the input/output pin 111 is abnormal. Therefore, the processing circuit 220 generates the error signal $S_{FL}$ to the input/output pin 112. When the voltage level of the detection signal $S_{DT}$ is the same as the voltage level of the driving signal $S_D$, it means that the voltage level $V_{111}$ of the input/output pin 111 is normal. Therefore, the processing circuit 220 does not generate the error signal $S_{FL}$.

Figure 2B:
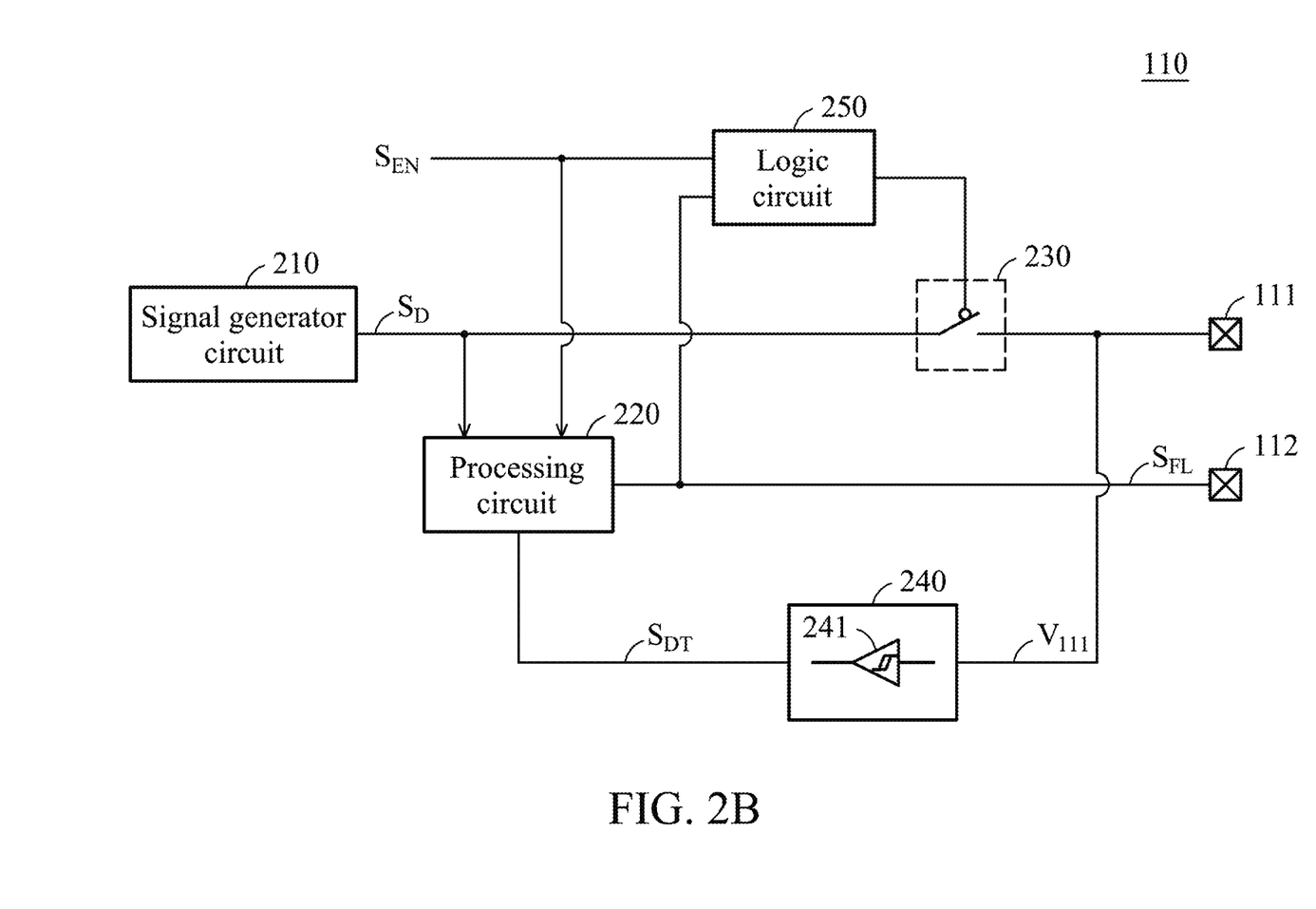
FIG. 2B is a schematic diagram of another exemplary embodiment of the driving protection circuit according to various aspects of the present disclosure.

FIG. 2B is a schematic diagram of another exemplary embodiment of the driving protection circuit 110 according to various aspects of the present disclosure. FIG. 2B is similar to FIG. 2A except for the addition of a logic circuit 250. The logic circuit 250 controls the input/output circuit 230 according to the enable signal $S_{EN}$ and the error signal Sr. In this embodiment, when the level of the enable signal $S_{EN}$ is equal to a predetermined level and the processing circuit 220 does not generate the error signal $S_{FL}$, the logic circuit 250 turns on the input/output circuit 230. Therefore, the input/output circuit 230 transmits the driving signal $S_D$ to the input/output pin 111. However, when the processing circuit 220 generates the error signal $S_{FL}$, the logic circuit 250 does not turn on the input/output circuit 230. Therefore, the input/output circuit 230 stops transmitting the driving signal $S_D$ to the input/output pin 111. In other embodiments, when the level of the enable signal $S_{EN}$ is not equal to the predetermined level, the logic circuit 250 does not turn on the input/output circuit 230.

Figure 2C:
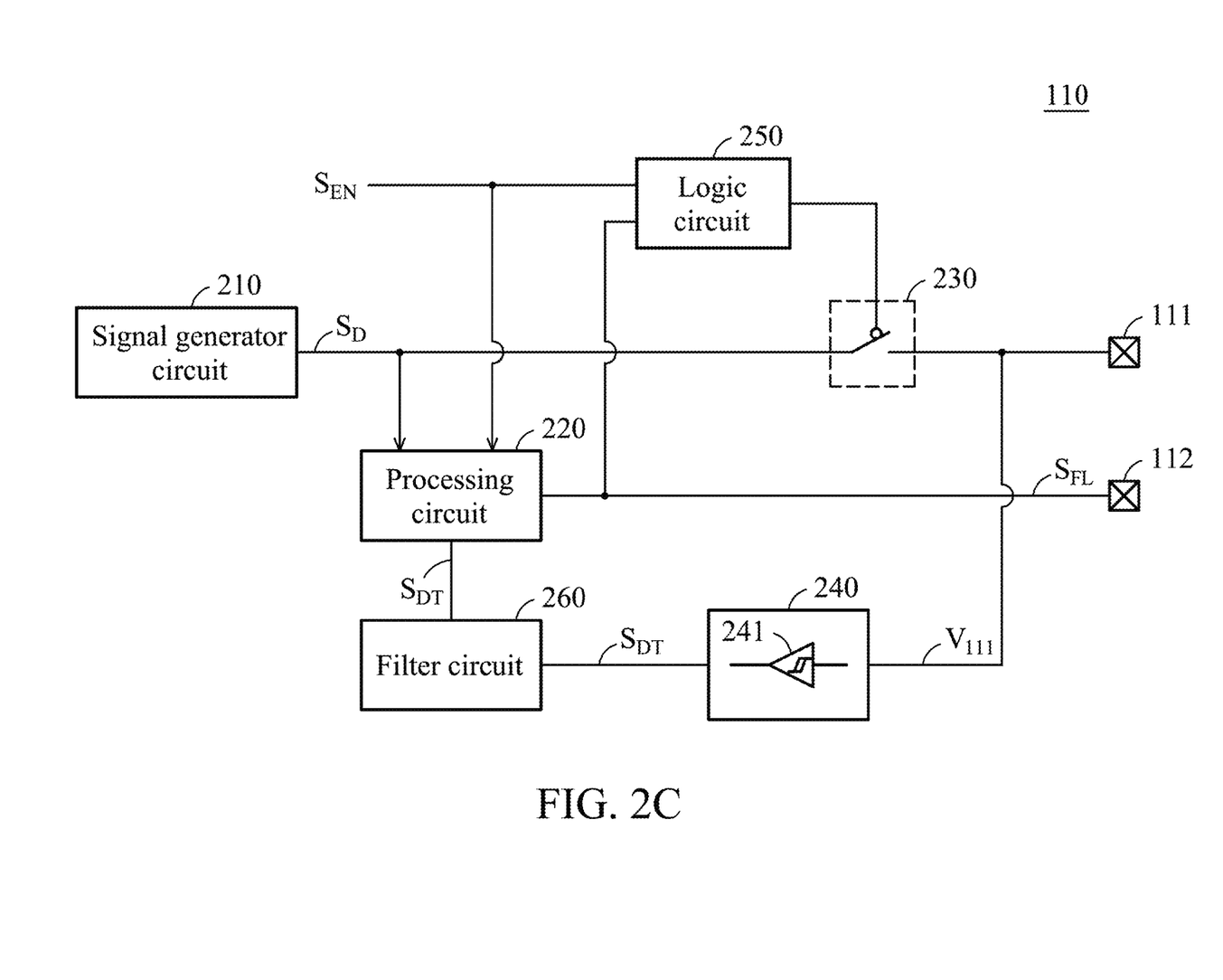
FIG. 2C is a schematic diagram of another exemplary embodiment of the driving protection circuit according to various aspects of the present disclosure.

FIG. 2C is a schematic diagram of another exemplary embodiment of the driving protection circuit 110 according to various aspects of the present disclosure. FIG. 2C is similar to FIG. 2B exception that the driving protection circuit 110 further comprises a filter circuit 260. The filter circuit 260 is configured to filter out the noise. For example, when the voltage level $V_{111}$ of the input/output pin 111 changes due to noise or an Electrical Static Discharge (ESD) event, the voltage level $V_{111}$ may be substantially higher than the first threshold value of the surge reduction filter 241, or substantially lower than the second threshold value of the surge reduction filter 241, but the changeover of the voltage level $V_{111}$ is quick, such as 2 nanoseconds. Therefore, when the voltage level $V_{111}$ is higher than the first threshold value or lower than the second threshold value, the filter circuit 260 determines the duration for which the voltage level $V_{111}$ is higher than the first threshold value or lower than the second threshold value.

Assuming that the detection signal $S_{DT}$ at a first level when the voltage level $V_{111}$ is higher than the first threshold value, and the detection signal $S_{DT}$ is at a second level when the voltage level $V_{111}$ is lower than the second threshold value. In this case, the filter circuit 260 determines the duration for which the detection signal $S_{DT}$ is at the first level or the second level. When the duration of the detection signal $S_{DT}$ being at the first level or the second level is less than the second predetermined time (e.g., 20 ns), it means that noise is interfering with the voltage level $V_{111}$ of the input/output pin 111. Therefore, the filter circuit 260 provides the driving signal $S_D$ to the processing circuit 220 after the level of the driving signal $S_D$ returns to an original level from the first or second level. For example, the duration when the driving signal $S_D$ is at the first level is 10 ns. After 10 ns, the driving signal $S_D$ returns to the second level. At this time, the filter circuit 260 outputs the driving signal $S_D$ which is at the second level to the processing circuit 220. However, if the duration when the driving signal $S_D$ is at the first level or at the second level is higher than the second predetermined time (e.g., 20 ns), it means that the changeover of the voltage level $V_{111}$ of the input/output pin 111 is not caused by noise. Therefore, the filter circuit 260 directly output the detection signal $S_{DT}$ to the processing circuit 220. At this time, the detection signal $S_{DT}$ is still maintained at the first or second level.

In one embodiment, the second predetermined time is stored in the filter circuit 260 in advance. In another embodiment, the second predetermined time is less than the first predetermined time of the processing circuit 220. The circuit structure of the filter circuit 260 is not limited in the present disclosure. In one embodiment, the filter circuit 260 utilizes a synchronous method or an asynchronous method to determine the duration of the detection signal $S_{DT}$. The filter circuit 260 may be a digital filter or an analog delay cell. In other embodiments, the filter circuit 260 may be combined with the detection circuit 240 or with the processing circuit 220. In some embodiments, the filter circuit 260 is applied in FIG. 2B.

Figure 3:
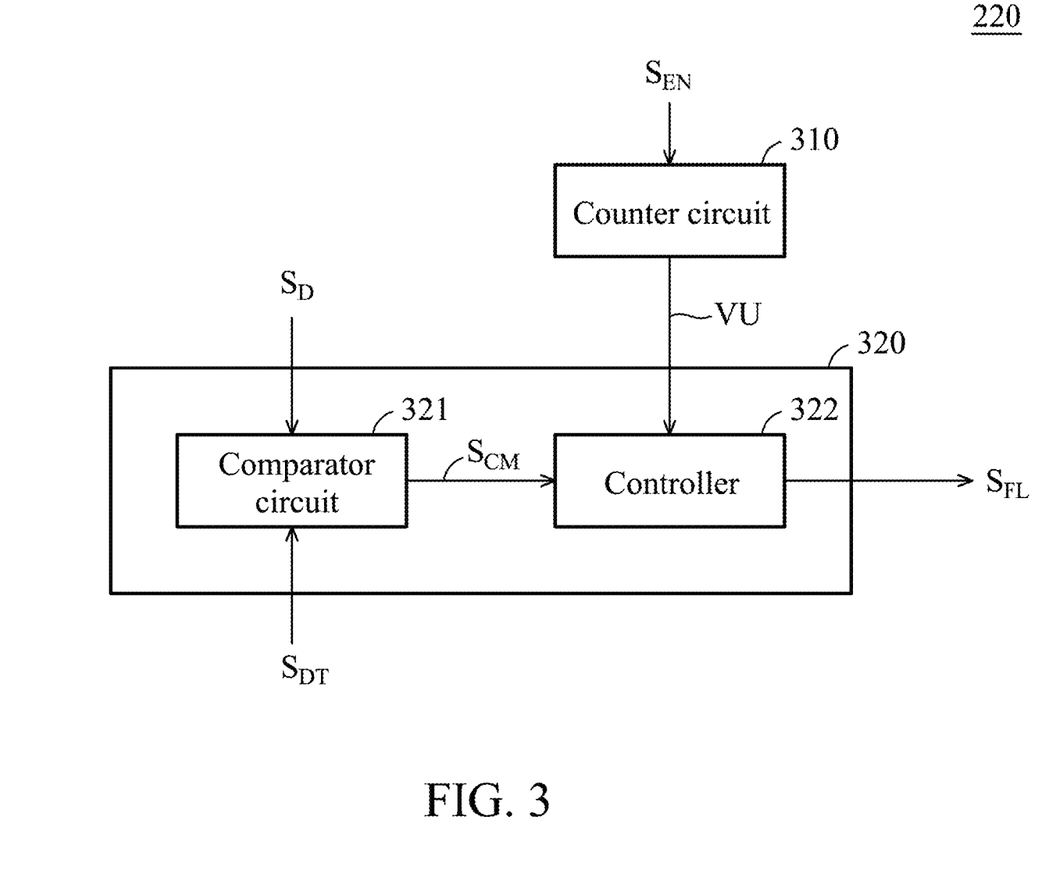
FIG. 3 is a schematic diagram of an exemplary embodiment of a processing circuit according to various aspects of the present disclosure.

FIG. 3 is a schematic diagram of an exemplary embodiment of the processing circuit 220 according to various aspects of the present disclosure. As shown in FIG. 3, the processing circuit 220 comprises a counter circuit 310 and a control circuit 320. The counter circuit 310 adjusts a count value VU according to the enable signal $S_{EN}$. In this embodiment, when the enable signal $S_{EN}$ is at a predetermined level, the counter circuit 310 resets the count value VU to an initial value and then adjusts (gradually increases or gradually reduces) the count value VU. However, when the enable signal $S_{EN}$ is not at the predetermined level, the counter circuit 310 does not adjust the count value VU.

The control circuit 320 is coupled to the counter circuit 310 to receive the count value VU. When the count value VU is equal to a predetermined value, the control circuit 320 starts to determine whether the level of the detection signal $S_{DT}$ is the same as the level of the driving signal $S_D$. When the level of the detection signal $S_{DT}$ is not the same as the level of the driving signal $S_D$, the control circuit 320 sends the error signal $S_{FL}$. However, when the level of the detection signal $S_{DT}$ is the same as the level of the driving signal $S_D$, the control circuit 320 does not send the error signal SF. In other embodiments, when the count value VU does not equal to the predetermined value, the control circuit 320 does not compare the levels of the detection signal $S_{DT}$ and the driving signal $S_D$. Therefore, even if the level of the detection signal $S_{DT}$ is not the same as the level of the driving signal $S_D$, the control circuit 320 does not send the error signal $S_{FL}$.

In this embodiment, the control circuit 320 comprises a comparator circuit 321 and a controller 322. The comparator circuit 321 compares the levels of the detection signal $S_{DT}$ and the driving signal $S_D$ to generate a compared signal $S_{CM}$. The controller 322 determines whether the count value VU is equal to a predetermined value. When the count value VU is equal to the predetermined value, the controller 322 determines whether to send the error signal $S_{FL}$ according to the compared signal $S_{CM}$. When the count value VU is not equal to the predetermined value, the controller 322 does not send the error signal $S_L$.

Figure 4:
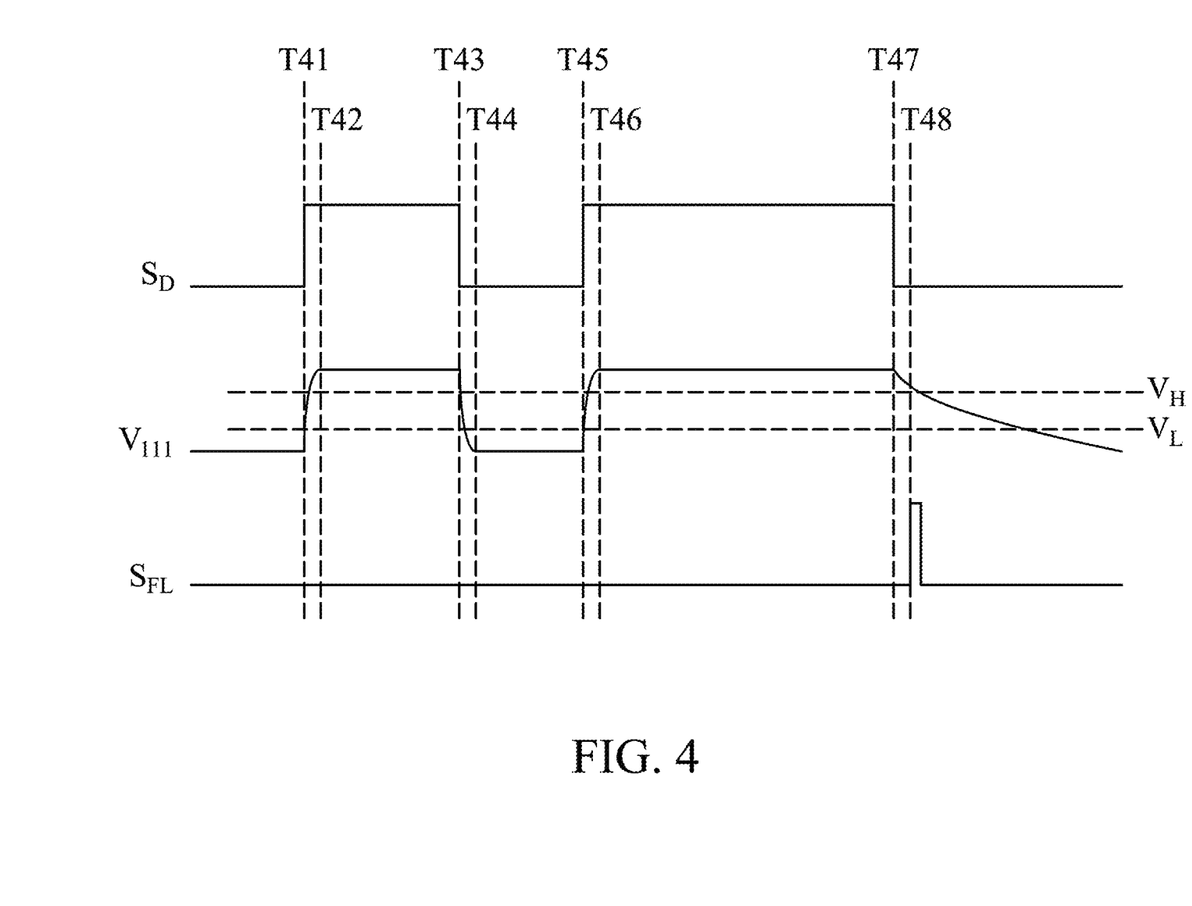
FIG. 4 is a schematic diagram of an exemplary embodiment of a driving signal, the voltage level of an input/output pin and an error signal according to various aspects of the present disclosure.

FIG. 4 is a schematic diagram of an exemplary embodiment of the driving signal $S_D$, the voltage level $V_{111}$ of the input/output pin 111 and the error signal SF according to various aspects of the present disclosure. As shown in FIG. 4, at time $T_{41}$, the level of the driving signal $S_D$ changes, i.e. from a low level to a high level. Therefore, the counter starts counting. At time $T_{42}$, the count value of the counter is equal to a predetermined value. At this time, since the voltage level $V_{111}$ of the input/output pin 111 is higher than a threshold level $V_H$, it can be regarded as the voltage level $V_{111}$ of the input/output pin 111 is a high level. At this time, since the voltage level $V_{111}$ of the input/output pin 111 and the voltage level of the driving signal $S_D$ are high level, the error signal SF is maintained at a predetermined level, such as a low level.

At time $T_{43}$, the level of the driving signal $S_D$ changes, i.e. from a high level to a low level. Therefore, the counter resets the count value and then adjusts the count value. At time $T_{44}$, the count value of the counter is equal to the predetermined value again. At this time, since the voltage level $V_{111}$ of the input/output pin 111 is lower than the threshold level $V_L$, it can be regarded as the voltage level $V_{111}$ of the input/output pin 111 being equal to the low level. At this time, since the voltage level $V_{111}$ of the input/output pin 111 and the level of the driving signal $S_D$ are at the low level, the level of the error signal $S_{FL}$ is at the low level.

At time $T_{45}$, the level of the driving signal $S_D$ changes, i.e. from a low level to a high level. Therefore, the counter resets the count value and then adjusts the count value. At time $T_{46}$, the count value of the counter is equal to the predetermined value again. At this time, since the voltage level $V_{111}$ of the input/output pin 111 is higher than the threshold level $V_H$, it can be regarded as the voltage level $V_{111}$ of the input/output pin 111 being equal to the high level. At this time, since the voltage level $V_{111}$ of the input/output pin 111 and the level of the driving signal $S_D$ are at the high level, the level of the error signal SF is at the low level.

At time $T_{47}$, the level of the driving signal $S_D$ changes, i.e. from the high level to the low level. Therefore, the counter starts counting. At time $T_{48}$, the count value of the counter is equal to the predetermined value. At this time, the voltage level $V_{111}$ of the input/output pin 111 is still higher than the threshold level $V_H$, it can be regarded as the voltage level $V_{111}$ of the input/output pin 111 being at the high level. At this time, since the voltage level $V_{111}$ of the input/output pin 111 is different from the level of the driving signal $S_D$, the error signal $S_{FL}$ is asserted from the low level to the high level.

Figure 5:
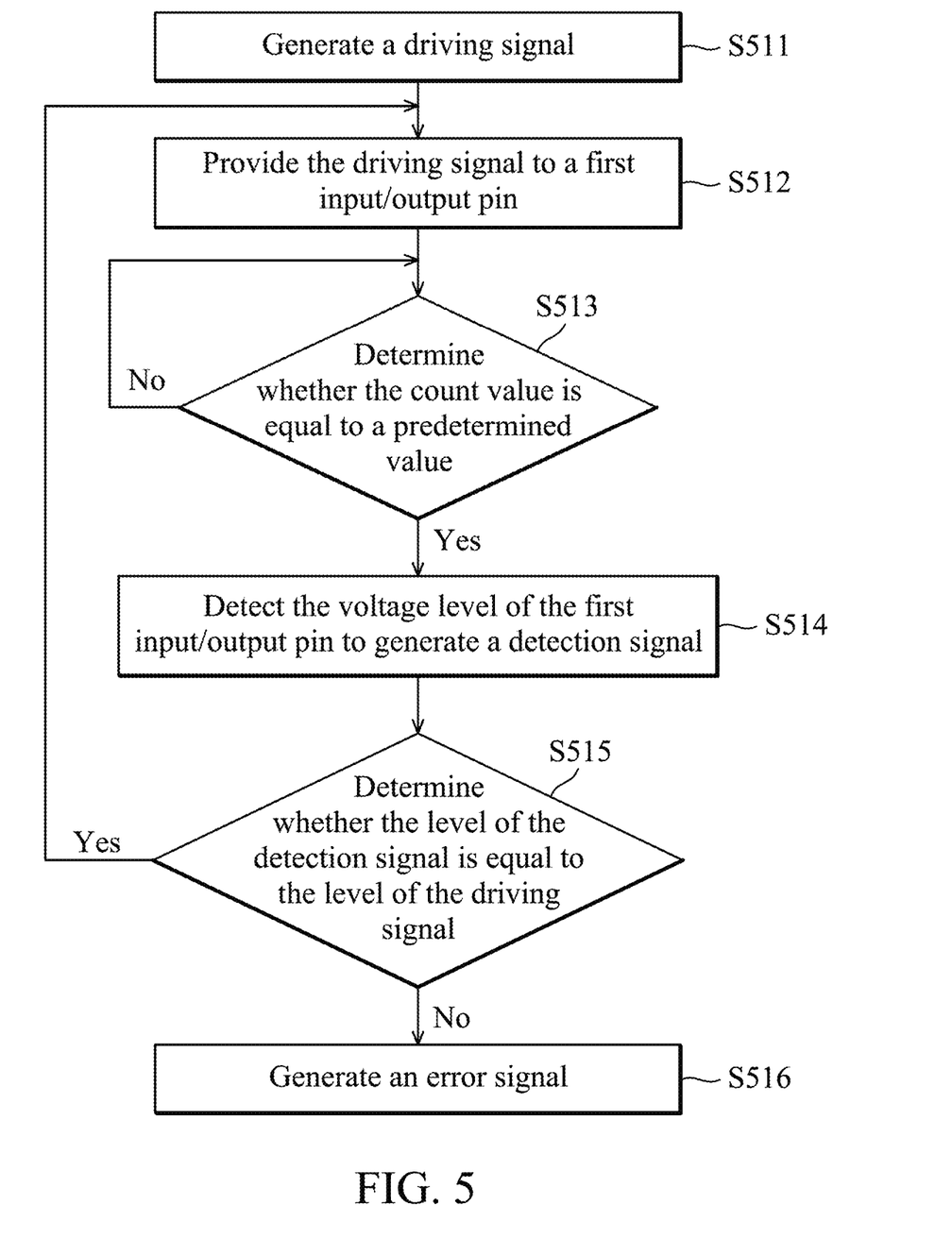
FIG. 5 is a flowchart of an exemplary embodiment of a control method according to various aspects of the present disclosure.

FIG. 5 is a flowchart of an exemplary embodiment of a control method according to various aspects of the present disclosure. First, a driving signal is generated (step S511). The kind of driving signal is not limited in the present disclosure. In one embodiment, the driving signal is a PWM signal. Then, the driving signal is provided to a first input/output pin and a counter circuit is enabled (step S512). In one embodiment, the first input/output pin provides the driving signal to a load. In other embodiments, when the counter circuit is enabled, the counter circuit resets a count value and then adjusts the count value. The counter circuit may gradually increase or reduce the count value.

A determination is made as to whether the count value is equal to a predetermined value (step S513). When the count value is not equal to the predetermined value, step S513 is performed. When the count value is equal to the predetermined value, the voltage level of the first input/output pin is detected to generate a detection signal (step S514. In one embodiment, a surge reduction filter is utilized in step S514. When the voltage level of the first input/output pin is higher than a first threshold level, the surge reduction filter sets the detection signal to a first level. When the voltage level of the first input/output pin is lower than a second threshold level, the surge reduction filter sets the detection signal to a second level. The surge reduction filter may be a Schmitt trigger.

A determination is made as to whether the level of the detection signal is equal to the level of the driving signal (step S515). When the level of the detection signal is equal to the level of the driving signal, it means that the voltage level of the first input/output pin is normal. Therefore, step S512 is performed to provide the driving signal to the first input/output pin. However, when the level of the detection signal is not equal to the level of the driving signal, it means that the voltage level of the first input/output pin is abnormal. Therefore, an error signal is generated to turn off the power to the load (step S516). In one embodiment, a second input/output pin is utilized to transmit the error signal to the load. In other embodiments, step 516 is to stop providing the driving signal to the first input/output pin.

When the voltage level of the first input/output pin is abnormal, the load may be damaged.

Therefore, the power of the load is turned off to prevent all system to be damaged by the abnormal level when the voltage level of the first input/output pin is abnormal. Then, when the driving signal is provided to the input/output pin, since the voltage level of the input/output pin reaches a target value after a period of time, the voltage level of the input/output pin may be different from the voltage level of the driving signal. At this time, if the voltage level of the input/output pin is compared with the level of the driving signal, the compared result may be wrong. To avoid the wrong result, after the driving signal is provided to the input/output pin, wait a period of time. When the count value is equal to a predetermined value, a determination is made as to whether the voltage level of the input/output pin is the same as the level of the driving signal. Therefore, the accuracy of the compared result is increased.

Control methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A driving protection circuit coupled to a load via an input/output pin and comprising:
   a signal generator circuit configured to generate a driving signal;
   an input/output circuit transmitting the driving signal to the input/output pin according to an enable signal;
   a counter circuit adjusting a count value in response to the enable signal being at a predetermined level;
   a detection circuit coupled to the input/output pin and detecting a voltage level of the input/output pin to generate a detection signal; and
   a control circuit coupled to the counter circuit and the detection circuit,
   wherein:
   in response to the driving signal being changed, the control circuit waits a period of time and then determines whether a level of the detection signal is the same as a level of the driving signal, and
   in response to the level of the detection signal not being the same as the level of the driving signal, the control circuit sends an error signal to turn off power to the load.

2. The driving protection circuit as claimed in claim 1, wherein in response to the count value not being equal to the predetermined value and the level of the detection signal not being the same as the level of the driving signal, the control circuit does not generate the error signal.

3. The driving protection circuit as claimed in claim 1, wherein the driving signal is a PWM signal.

4. The driving protection circuit as claimed in claim 3, wherein the input/output circuit is a buffer, and in response to the enable signal being at the predetermined level, the buffer transmits the PWM signal to the input/output pin, and in response to the enable signal not being at the predetermined level, the buffer stops transmitting the PWM signal to the input/output pin.

5. The driving protection circuit as claimed in claim 1, wherein in response to the enable signal not being at the predetermined level, the counter circuit stops adjusting the count value.

6. The driving protection circuit as claimed in claim 1, wherein in response to the control circuit sending the error signal, the input/output circuit stops transmitting the driving signal to the input/output pin.

7. The driving protection circuit as claimed in claim 1, wherein the detection circuit comprises a surge reduction filter,
   in response to the voltage level of the input/output pin being higher than a first threshold level, the surge reduction filter sets the detection signal to a first level, and
   in response to the voltage level of the input/output pin being lower than a second threshold level, the surge reduction filter sets the detection signal to a second level.

8. The driving protection circuit as claimed in claim 7, wherein the surge reduction filter is a Schmitt trigger.

9. An operating circuit comprising:
   a power supply circuit configured to provide an operating voltage;
   a transistor configured to receive the operating voltage;
   a first input/output pin coupled to a gate of the transistor; and
   a driving protection circuit coupled to the first input/output pin and comprising:
   a signal generator circuit configured to generate a driving signal;
   an input/output circuit transmitting the driving signal to the first input/output pin according to an enable signal;
   a counter circuit adjusting a count value in response to the enable signal being at a predetermined level;
   a detection circuit coupled to the first input/output pin and detecting a voltage level of the first input/output pin to generate a detection signal; and
   a control circuit coupled to the counter circuit and the detection circuit,
   wherein:
   in response to the driving signal being changed, the control circuit waits a period of time and then determines whether a level of the detection signal is the same as a level of the driving signal, and
   in response to the level of the detection signal not being the same as the level of the driving signal, the control circuit sends an error signal to turn off power to the load.

10. The operating circuit as claimed in claim 9, further comprising:
    a second input/output pin configured to transmit the error signal to the power supply circuit.

11. The operating circuit as claimed in claim 9, wherein in response to the count value not being equal to the predetermined value and the level of the detection signal not being the same as the level of the driving signal, the control circuit does not generate the error signal.

12. The operating circuit as claimed in claim 9, wherein the driving signal is a PWM signal.

13. The operating circuit as claimed in claim 12, wherein the input/output circuit is a buffer, in response to the enable signal being at the predetermined level, the buffer transmits the PWM signal to the input/output pin, and in response to the enable signal not being at the predetermined level, the buffer stops transmitting the PWM signal to the input/output pin.

14. The operating circuit as claimed in claim 9, wherein in response to the enable signal not being at the predetermined level, the counter circuit stops adjusting the count value.

15. The operating circuit as claimed in claim 9, wherein in response to the control circuit sending the error signal, the input/output circuit stops transmitting the driving signal to the input/output pin.

16. The operating circuit as claimed in claim 9, wherein the detection circuit comprises a surge reduction filter,
    in response to the voltage level of the input/output pin being higher than a first threshold level, the surge reduction filter sets the detection signal to a first level, and
    in response to the voltage level of the input/output pin being lower than a second threshold level, the surge reduction filter sets the detection signal to a second level.

17. The operating circuit as claimed in claim 16, wherein the surge reduction filter is a Schmitt trigger.

18. A control method comprising:
    generating a driving signal;
    providing the driving signal to an input/output pin and enabling a counter circuit, wherein the input/output pin is coupled to a load;
    in response to the driving signal being provided to the input/output pin, waiting a period of time;
    after waiting the period of time, detecting a voltage level of the input/output pin to generate a detection signal;

determining whether a count value of the counter circuit is equal to a predetermined value;

in response to determining that the count value of the counter circuit is equal to the predetermined value, determining whether a level of the detection signal is the same as a level of the driving signal; and in response to determining that the level of the detection signal is not the same as the level of the driving signal, turning off power to the load.

19. The control method as claimed in claim 18, wherein in response to determining that the level of the detection signal is not the same as the level of the driving signal, the driving signal is not provided to the input/output pin.

20. The control method as claimed in claim 18, wherein in response to determining that the level of the detection signal is the same as the level of the driving signal, the driving signal is provided to the input/output pin.

* * * * *